Feb. 3, 1970    R. B. STEWART    3,492,726
ANALYTICAL INSTRUMENT
Filed May 7, 1968
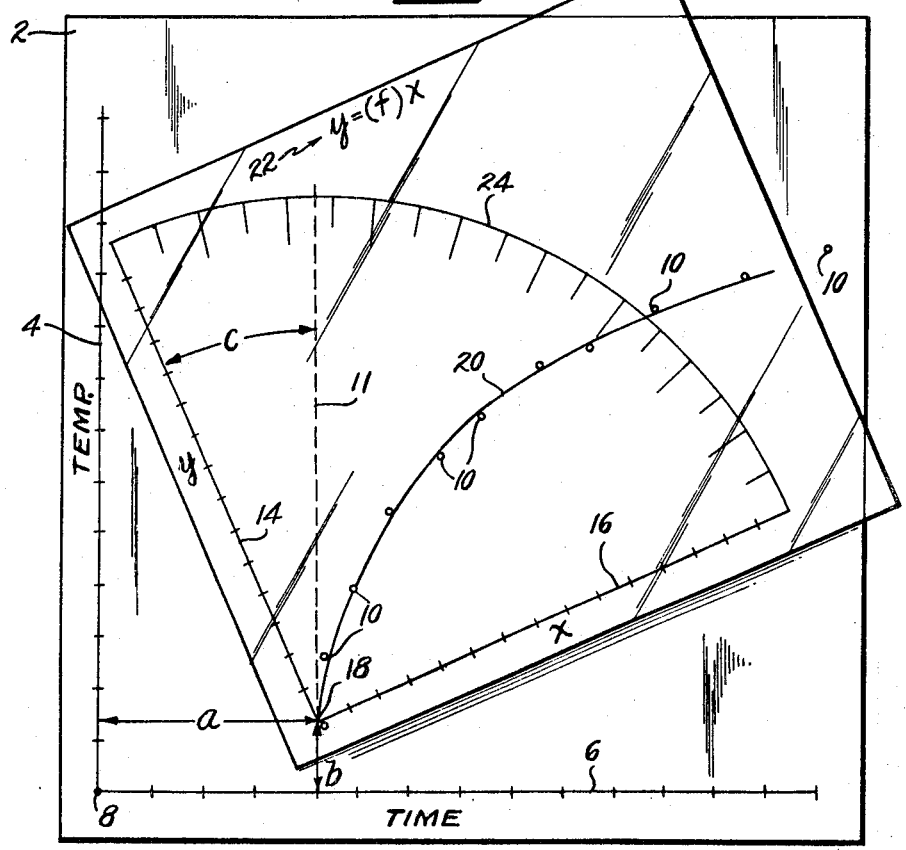
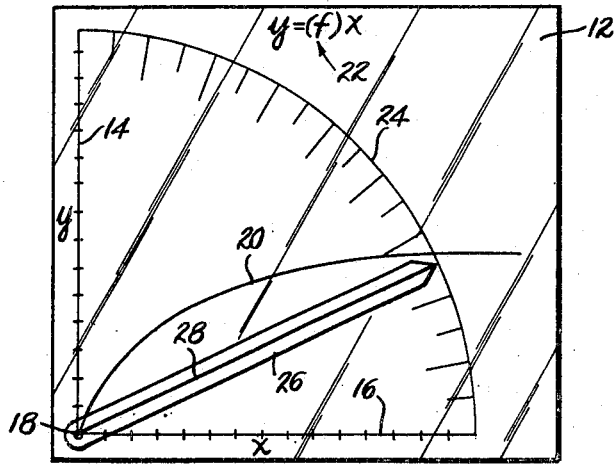
INVENTOR.
ROGER B. STEWART
BY Bacon & Thomas
ATTORNEYS 3,492,726
ANALYTICAL INSTRUMENT
Roger B. Stewart, Rte. 3, Box 172C,
Yorktown, Va. 23490
Filed May 7, 1968, Ser. No. 727,246
Int. Cl. B43l 13/20
U.S. Cl. 33—1                           1 Claim

ABSTRACT OF THE DISCLOSURE

A transparent sheet having a mathematically defined curve and its coordinate axes permanently delineated thereon along with a protractor scale having its center at the origin of the coordinate system. Observed data is plotted on a chart against different coordinate parameters and the transparent instrument sheet is placed thereover so that its curve coincides with that defined by the plotted data. The angular and lateral displacements of the two coordinate systems can thus be measured to provide transformation factors for expressing the curve of the plotted data by an equation based on its own coordinate system.

BACKGROUND OF THE INVENTION

This invention relates to analytical instruments for determining the equations of experimentally determined and graphically plotted values.

Research and other activities frequently result in the production of plotted graphs comprising spaced points representing observed values and it is usually desirable to establish the values of all intermediate points to determine the conditions between the plotted values. Such can be done by determining those values and storing each separate plotted point in computer memory systems but even then successive values of the variables for very small intervals would require exceptionally large storage space in a computer system. Even then interpolation between successive values is often necessary.

SUMMARY OF THE INVENTION

The present invention comprises a transparent instrument having a mathematically expressed curve delineated thereon with reference to a permanently delineated coordinate system and suitable protractor means. The instrument can be positioned and manipulated over a series of plotted value points so that the curve coincides with the curve defined by those points. When this is accomplished the angular relationship between the coordinate system of the instrument and the coordinate system of the plotted points may be readily determined and the relative lateral displacements of those coordinate systems can also be determined by simple and direct measurement. Knowing the mathematical equation for the curve on the instrument, the displacements and angular relationships may then be employed by well known substitution techniques to transform the equation of the curve on the instrument to the equation of the curve defined by the plotted points with reference to their own coordinate system, within the limits of accuracy of the observed data.

It is contemplated that more than one such curve may be delineated on the same instrument, preferably having the same equation but different constant parameters or a set of a multiplicity of such instruments, each having a differently defined curve, may be provided to ensure the ability to obtain coincidence with any set of plotted points.

It has been found from actual tests with second degree curves that the aforementioned method can easily provide very close agreement between continuous-curve recorded data and the mathematical equations of the present instrument within the necessary degree of accuracy for computer programming.

The use of the present analytical instrument may also be applied to the teaching of analytical geometry and particularly in demonstrating transformations from one coordinate system to another.

In many applications the curve on the present instrument may provide only a portion thereof which fits the observed data. This presents no difficulty, however, as the limits of validity of the derived equation can be easily specified and entered into a computer program. In some applications the grid size of the analytical curve may be different from the grid size on which the observed data is plotted. In such case a numerical factor can be easily introduced into the transformation equations, thus adapting the instrument for use over a wide range of grid sizes.

Tabulated data from the solution of high order equations often cannot be conveniently subjected to "curve fitting" by computer. Such data is graphical form, however, can be readily analyzed by the apparatus and method of the present invention.

BRIEF DESCRIPTION OF THE DRAWINGS

FIG. 1 is a plan view of an instrument embodying the present invention and showing the same in use; and FIG. 2 is a plan view of a second embodiment of the invention.

DESCRIPTION OF THE PREFERRED EMBODIMENTS

Referring first to FIG. 1, numeral 2 represents a sheet or chart having a first coordinate system imprinted thereon and comprising the coordinate axes 4 and 6 and an origin 8. The coordinate axes 4 and 6 are divided into suitable units representing a grid on the chart 2. In the example illustrated, a series of observed values are plotted on the chart 2 and the separate plotted points are indicated at 10. In this example the points 10 represent the relationship of temperature to time but this is by way of example only. An instrument according to the present invention comprises a transparent sheet 12 having permanently delineated thereon a second set of coordinate axes 14 and 16, representing the X and Y axes of a cartesian coordinate system having an origin at 18. Permanently delineated on the sheet 12 is a continuous mathematical curve 20 represented by the mathematical equation appearing at 22. Also permanently delineated on the sheet 12 is a protractor scale 24, in this embodiment having its center at the origin 18. As shown in FIG. 1, the sheet 12 has been manipulated to a position where its curve 20 substantially coincides with the imaginary curve represented by the plotted points 10 at least throughout substantially the entire limits of the plotted information. With the parts in this position the angle C may be readily measured and noted, the line 11 being any reference line parallel to one of the axes 4 or 6. This angle indicates the relative angular positions of the first and second coordinate systems described. Also, the displacement dimensions $a$ and $b$ may be measured directly. These displacements represent the relative positions of the origins 8 and 18. With the angle C and the displacements $a$ and $b$ known, substitutions may be made in the equation 22 and thereby an equation is derived for the imaginary curve defined by the points 10 expressed in terms of the coordinate system on the sheet 2 with reference to the axes 4 and 6. Thus, the derived equation represents the relationship between time and temperature throughout the entire range of the plotted points 10 and the values of time as related to temperature may be determined for any values between the observed and plotted points 10. Obviously, the derived equation may be used in programming a computer system for readily determining any value of temperature for any desired value of time.

FIG. 2 illustrates a modified form of the invention wherein the transparent sheet 12 has a pointer 26 pivoted thereon about an axis coinciding with the origin 8. The pointer 26 is provided with a visible line 28 extending radially from the origin 8 and cooperating with the protractor scale 24. In this form the pointer 26 facilitates determination of the angle C previously referred to since the line 28 on the pointer 26 (which pointer is preferably transparent) may be positioned in parallel relation to any of the grid lines on the plotted chart.

In the examples described only rectanglar cartesian coordinates are shown but it will be obvious that other coordinate systems may be employed, for example, polar or cylindrical systems. Also it is apparent that other means than the scale 24 and/or pointer 26–28 may be provided for determining the angle C.

According to this invention curves such as the curve 20 could be provided to represent discontinuous functions where necessary when the plotted data is discontinuous in nature.

While a limited number of specific embodiments of the invention have been shown and described herein, it is to be understood that the same are merely illustrative of the principles involved.

I claim:

1. The method of determining conversion factors for converting a known equation to the equation of a curve defined by spaced plotted points on a chart, plotted thereon with reference to a first coordinate system, comprising the steps of:

superimposing on said chart a transparent sheet having visibly delineated thereon a second coordinate system comprising delineated axes, a known mathematical curve, and the said known equation of said curve with reference to said second coordinate system;

manipulating said sheet to bring said curve thereon into a position substantially coincident with the curve defined by said plotted points; and measuring the angular displacement of said axes from said first coordinate system and measuring the lateral displacements of said second coordinate system relative to said first coordinate system to thereby determine said conversion factors for converting said known equation to the equation of said same curve with reference to said first coordinate system.

References Cited

UNITED STATES PATENTS

| 727,680 | 5/1903 | Otis | 33—104 |
|---|---|---|---|
| 759,935 | 5/1904 | Swenson | 33—104 |
| 3,024,692 | 4/1962 | Skeggs. | |
| 3,018,552 | 1/1962 | Adams. | |

LEONARD FORMAN, Primary Examiner

DENNIS A. DEARING, Assistant Examiner